(12) United States Patent
Lee

(10) Patent No.: US 7,263,784 B1
(45) Date of Patent: Sep. 4, 2007

(54) ENHANCED STRUCTURE FOR MEASURING TAPE

(76) Inventor: Shih-Lin Lee, No. 22, Lane 81, Sec. 2, Tunhwa S. Rd., Taipei (TW)

( * ) Notice: Subject to any disclaimer, the term of this patent is extended or adjusted under 35 U.S.C. 154(b) by 0 days.

(21) Appl. No.: 11/672,959

(22) Filed: Feb. 9, 2007

(51) Int. Cl.
*G01B 3/10* (2006.01)

(52) U.S. Cl. .......................... 33/767; 33/761; 242/385; 242/384.7; 242/381.3

(58) Field of Classification Search .......... 33/755–771; 242/385, 385.2, 385.4, 384.7, 381.3
See application file for complete search history.

(56) References Cited

U.S. PATENT DOCUMENTS

| | | | | |
|---|---|---|---|---|
| 5,245,761 A | * | 9/1993 | Waldherr | 242/384.7 |
| 5,400,521 A | * | 3/1995 | Waldherr | 33/767 |
| 5,471,761 A | * | 12/1995 | Cheng | 33/761 |
| 6,276,071 B1 | * | 8/2001 | Khachatoorian | 33/767 |
| 6,416,009 B1 | * | 7/2002 | Iaciofano et al. | 242/384.7 |
| 6,431,486 B1 | * | 8/2002 | Lee | 242/381.3 |
| 6,470,590 B1 | * | 10/2002 | Lee | 33/767 |

* cited by examiner

*Primary Examiner*—G. Bradley Bennett
*Assistant Examiner*—Tania C Courson

(74) *Attorney, Agent, or Firm*—Ming Chow; Sinorica, LLC

(57) ABSTRACT

An enhanced structure for measuring tape, comprises a tape casing having a wheel disposed in its interior, a metal tape being wound around said wheel 11 and having a tail end fixedly connected to said wheel so as to generate elastic force to let said tape eject automatically from said tape casing when no braking force is applied; a press button pivotally connects to the top of said tape casing, said press button having a curved tooth face disposed at top of inner wall thereof, with said curved tooth face and a removable transmission element meshing with each other; and a driving element and a power receiving element mesh with each other and are disposed near said transmission element, wherein said power receiving element links with said wheel; a user can use one hand to eject the tape, when he/she wants to retract the tape, he/she can press said press button with the hand that holds the measuring tape to let said curved tooth face inside said press button to rotate downward for an angle, and then to drive said transmission element to move down a length to let said transmission element mesh with said driving element, thus causing said transmission element to receive power from said driving element and to drive said power receiving element to rotate for an angle, so as to drive said wheel to turn reversely to retract a length of said tape, when said press button is not being pressed, an elastic force of said retracting element returns said press button to an original position to let said transmission element break away from said driving element. By repeating the above steps, said tape is retracted to said tape casing, while all operations are done with one hand.

15 Claims, 8 Drawing Sheets

ENHANCED STRUCTURE FOR MEASURING TAPE

BACKGROUND OF THE INVENTION

1. Field of the Invention

The present invention is related to an enhanced structure for measuring tape, and more particularly, to an enhanced structure for measuring tape which allows a user to use one hand to let tape eject automatically and continuously, and when the user wants to retract the tape, he/she can use the hand that holds the measuring tape to retract the tape automatically, thereby finishing all operations with one hand.

2. Description of the Prior Art

Measuring tapes are widely used in all kinds of applications such as home decoration, furnishing, and construction and so on to provide measuring capabilities. Therefore, measuring tapes have become an indispensable measuring equipment in daily life.

In using a traditional measuring tape, one has to pull the tape out of the casing of the measuring tape, then uses the elastic force generated by the spring inside the casing to automatically retract the tape back to the casing. However, this operation is disadvantageous in:

1. When the user tries to pull out the tape, it is often that the tape quickly returns into the casing of the measuring tape without being fully pulled out to a desired length, making it inconvenient for users to operate.

2. Traditional measuring tape uses a spring disposed inside the casing to quickly retract the tape back into the casing by the elastic force of the spring. Therefore, it is often that the tape could slash one's hand during fast retraction movement of the tape. Meanwhile, the tape could be easily worn out when the tape returns to the casing and rubs against the casing during high speed retraction.

Therefore, the above-mentioned traditional measuring tapes present several shortcomings to be overcome.

In view of the above-described deficiencies of traditional measuring tapes, after years of constant effort in research, the inventor of this invention has consequently developed and proposed an enhanced structure for measuring tape in the present invention.

SUMMARY OF THE INVENTION

It is an object of the present invention to provide an enhanced structure for measuring tape which lets the tape eject and retract automatically and continuously to provide user-friendly operation, while avoiding high speed retraction to hurt users.

It is another object of the present invention to provide an enhanced structure for measuring tape, which reduces the use of spring to save cost.

The present invention provides an enhanced structure for measuring tape, which comprises a tape casing, a transmission element, a driving element, a press button, a brake portion, a power receiving element and a retracting element; wherein said tape casing has a slightly I-shaped wheel disposed in fixed position, said wheel has a metal tape wound around said wheel for said metal tape to generate elastic force, a tail end of said metal tape is fixed to said wheel to avoid tape to eject from said tape casing completely, a tape outlet is disposed at the bottom of said tape casing for said metal tape to eject; said brake portion comprises a control element and a brake element which link with each other, and a shaft for a torsion spring to connect with, said brake portion tape links up with the bottom of said tape casing and is placed near said tape outlet for said control element of said brake portion to protrude outside said tape casing and said brake element to lean against a surface of said tape, and said control element to lean against a moving end of said torsion spring, when said control element moves backward, it will pull said brake element to break away from said tape to let said tape eject by its own elastic force, when said control element of said brake portion is not pressed, said control element will go back by the elastic force of said torsion spring; said transmission element removably links with a lateral surface of said tape casing; said driving element pivotally connects to the same surface which links said transmission element; said power receiving element and said driving element mesh with each other, while said power receiving element links with said wheel; said press button pivotally connects to the top of said tape casing, said press button has a curved tooth face disposed at top of inner wall thereof, with said curved tooth face and a removable transmission element meshing with each other; said retracting element has one fixed end and another end fixedly connected to said press button, when said press button is being pressed, said retracting element would generate elastic force to retract said press button; when said press button is being pressed, said curved tooth face inside said press button would rotate downward for an angle, and then drives said transmission element to move down a length to let said transmission element mesh with said driving element, thus causing said transmission element to receive power from said driving element and to drive said power receiving element to rotate for an angle, so as to drive said wheel to turn reversely to retract a length of said tape, when said press button is not being pressed, an elastic force of said retracting element returns said press button to an original position to let said transmission element break away from said driving element. By repeating the above steps, said tape is retracted to said tape casing, while all operations are done with one hand.

These features and advantages of the present invention will be fully understood and appreciated from the following detailed description of the accompanying Drawings.

DETAILED DESCRIPTION OF THE PREFERRED EMBODIMENT

Figure 1:
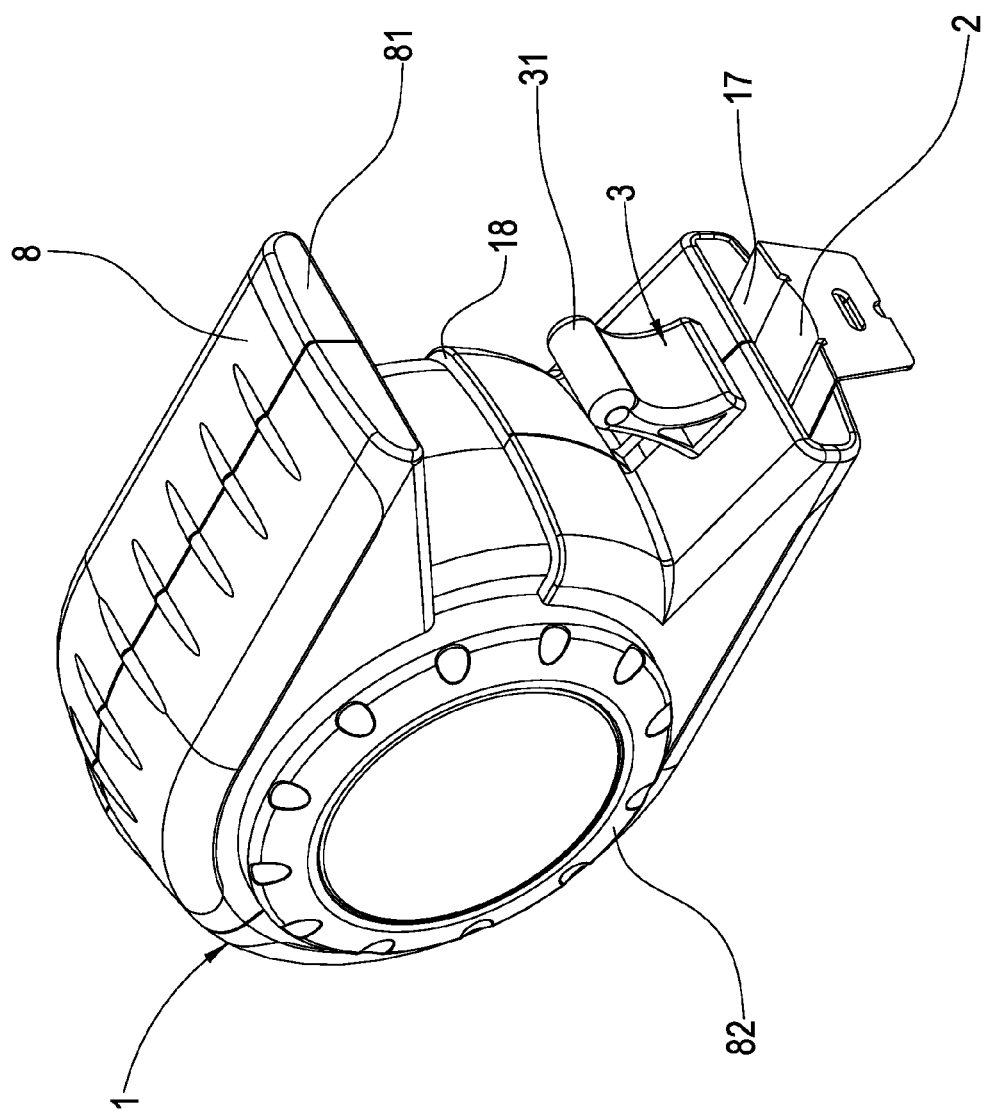
FIG. 1 illustrates a 3D view of the enhanced structure for measuring tape disclosed in the present invention.
Figure 2:
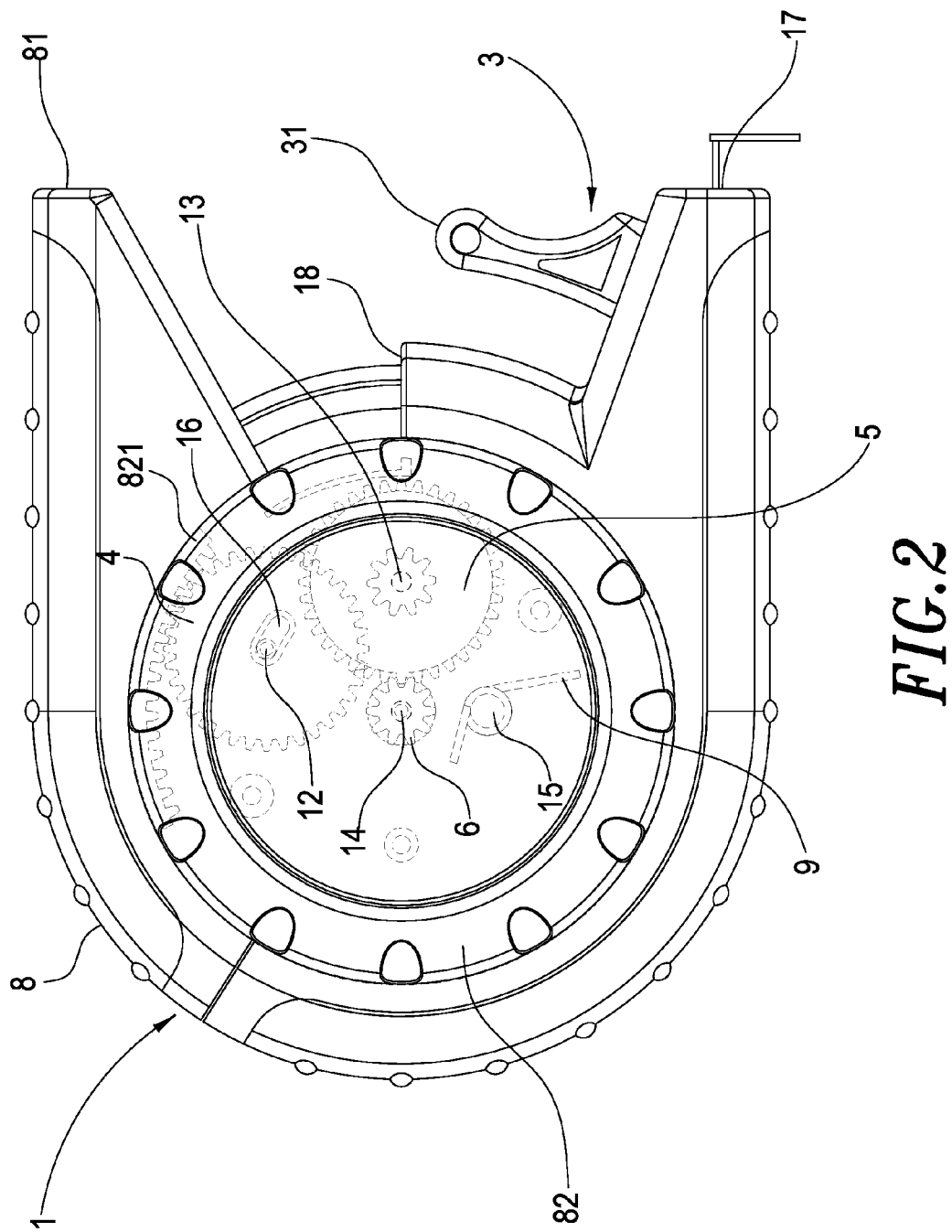
FIG. 2 illustrates a first side view of the enhanced structure for measuring tape disclosed in the present invention.
Figure 3:
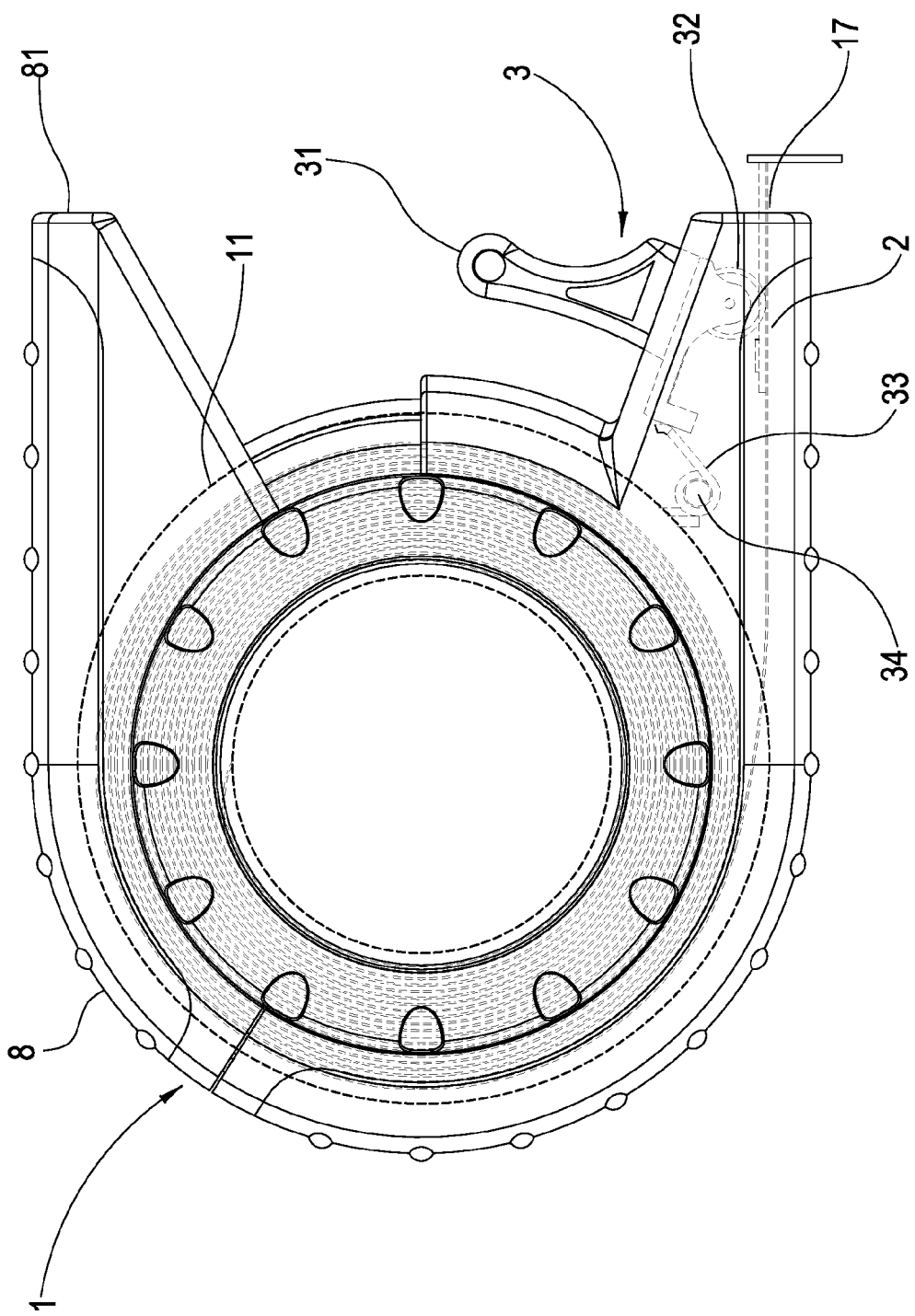
FIG. 3 illustrates a second side view of the enhanced structure for measuring tape disclosed in the present invention.
Figure 4:
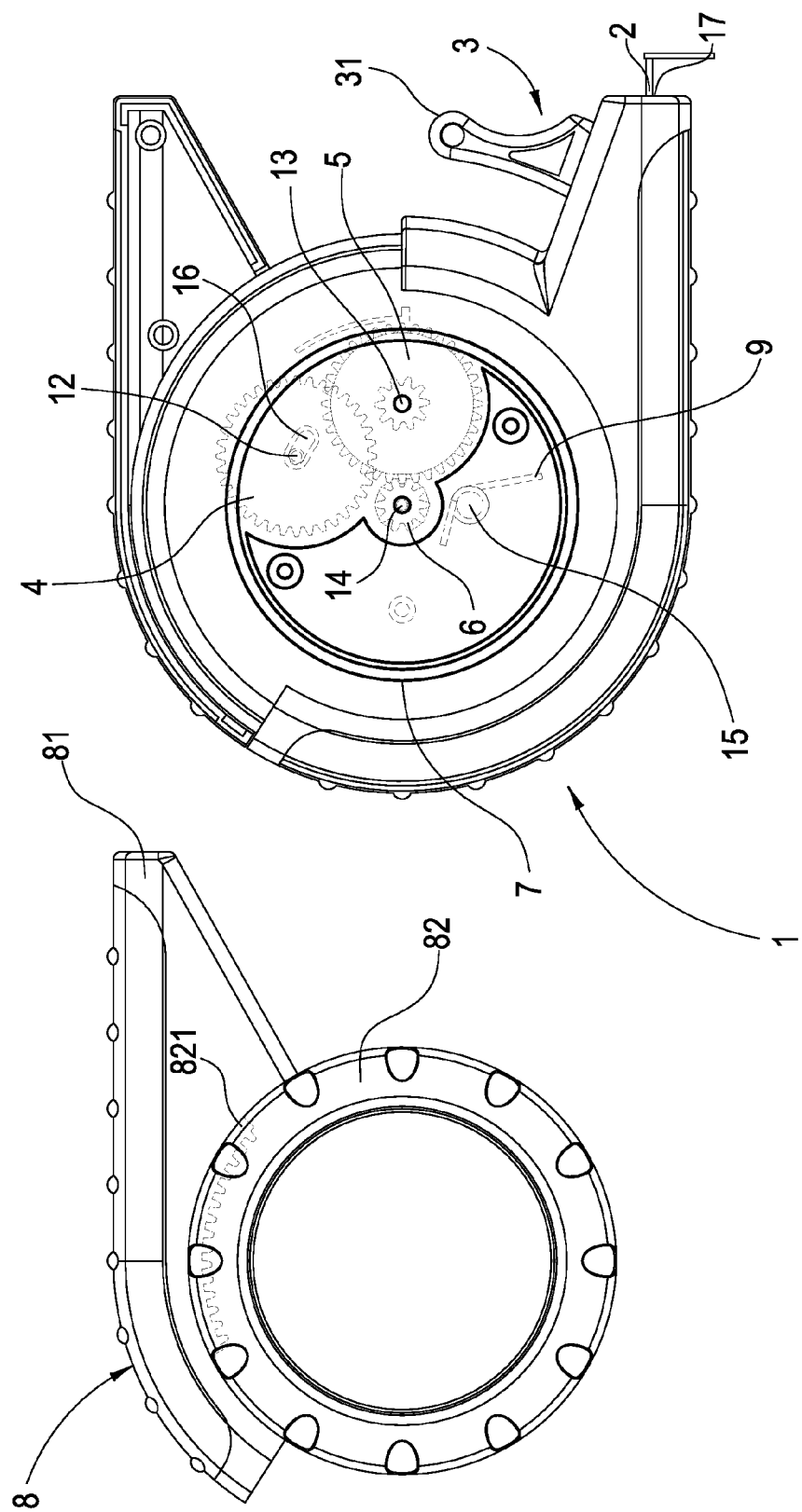
FIG. 4 illustrates a third side view of the enhanced structure for measuring tape disclosed in the present invention.

Please refer to FIG. 1 to FIG. 4 for an enhanced structure for measuring tape, which mainly comprises:

a tape casing 1, the tape casing 1 has a slightly I-shaped wheel 11 disposed inside, the wheel 11 has a metal tape 2 wound around the wheel 11 for the metal tape 2 to generate elastic force to eject automatically, a tail end of the metal tape 2 is fixed to the wheel 11 to avoid the tape 2 to eject from the tape casing 1 completely, a retaining portion is disposed outside of tape casing 1, and a first, second, third, and fourth pivot 12, 13, 14, 15 extends from a lateral surface of the wheel 11, wherein the third pivot 14 extends from the center of the wheel 11, the first, second, third, and fourth pivot 12, 13, 14, 15 protrude out of a lateral surface of the tape casing 1, and the first pivot 12 passes through a guide trough 16 on the surface of the tape casing 1 and moves inside the guide trough 16; besides, the second and fourth pivot 13, 15 can protrude from the surface of the tape casing 1, a tape outlet 17 is disposed at the bottom of the tape casing 1;

a brake portion 3, the brake portion 3 comprises a control element 31 and a brake element 32 linking with each other, and a shaft 34 connecting with a torsion spring 33, the brake portion 3 removably links up with the bottom of said tape casing 1 and is placed near the tape outlet 17 for the control element 31 of the brake portion 3 to protrude out of the tape casing 1 and the brake element 32 to lean against a surface of the tape 2, the shaft 34 is fixed inside the tape casing 1 and placed behind the brake element 32 for the torsion spring 33 on the shaft 34 to be held against the bottom of the control element 31; the brake element 32 can be a roller to facilitate retraction of the tape 2 and to keep the tape 2 from being worn out.

a transmission element 4, the transmission element 4 pivotally connects to the first pivot 12 outside the tape casing 1, the transmission element 4 can be a gear.

a driving element 5, the driving element 5 pivotally connects to the second pivot 13 outside the tape casing 1, the driving element 5 can be two gears f different size;

a power receiving element 6, the power receiving element 6 pivotally connects to the third pivot 14 outside the tape casing 1 for the power receiving element 6 to link with the wheel 11, and the power receiving element 6 and the driving element 5 mesh with each other;

a cover 7, the cover 7 combines with the surface of the tape casing 1 which is disposed with the transmission element 4, the driving element 5 and the power receiving element 6, the cover 7 covers the transmission element 4, the driving element 5 and the power receiving element 6 and fixes them in position to keep the transmission element 4, the driving element 5 and the power receiving element 6 from breaking away from the first, second, and third pivot 12, 13, 14 of the tape casing 1;

a press button 8, the press button 8 having a press portion 81 and a round pivot joint portion 82, the pivot joint portion 82 has a curved tooth face 821 disposed at top of inner wall thereof, the press button 8 pivotally connects to the tape casing 1 to have the press portion 81 of the press button 8 placed on top of the tape casing 1, the round pivot joint portion 82 of the press button 8 pivotally connects to both lateral sides of the tape casing 1 the curved tooth face 821 on the inner wall of the pivot joint portion 82 to mesh with the transmission element 4, if the press portion 81 of press button 8 is being pressed, the pivot joint portion 82 can turn synchronously, besides, when the press button 8 is being pressed, it would be held by the retaining portion 18 of the tape casing 1, therefore the moving distance of the press button 8 is limited;

a retracting element 9, the retracting element 9 connects with the fourth pivot 15 outside tape casing 1 with its one end fixed to the tape casing 1 an another end fixed to the press button 8;

wherein the transmission element 4, the driving element 5 and the power receiving element 6 can all be gears, and the driving element 5 can be two gears which mesh with each other and have different gear ratios, wherein the gear with smaller gear ratio meshes with the transmission element 4 and the gear with larger gear ratio meshes with the power receiving element 6.

among which, the number of transmission element 4 and driving element 5 can be adjusted based on request, and thus has no limitation.

Figure 5:
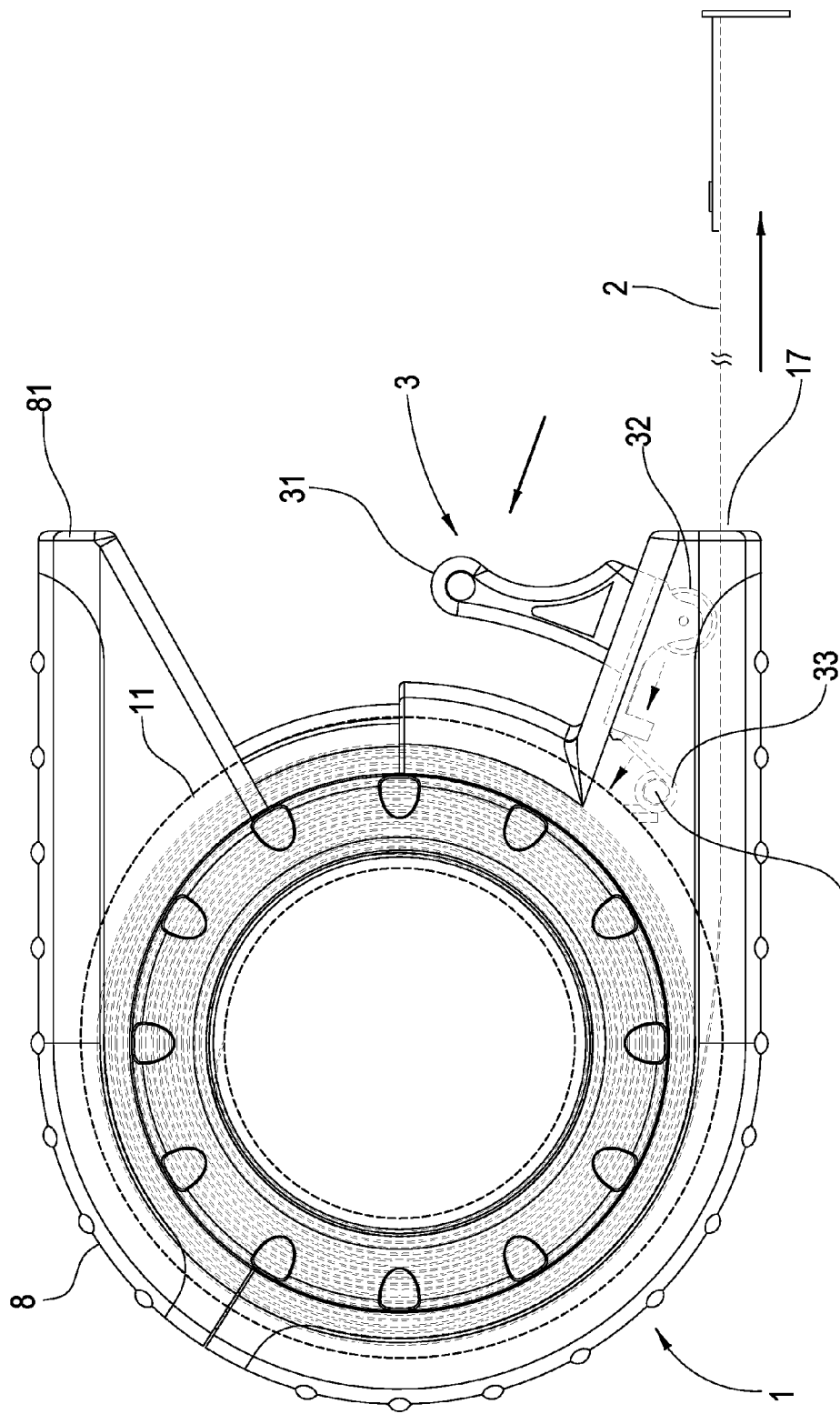
FIG. 5 illustrates a tape output view of the enhanced structure for measuring tape disclosed in the present invention.

FIG. 5 illustrates a tape output view of the enhanced structure for measuring tape disclosed in the present invention. When rejecting the tape 2, a user holds the tape casing 1 with one hand and uses one finger to push back the control element 31 of brake portion 3 to let the torsion spring 33 generate elastic force. The control element 31 pulls the brake element 32 to break away from the surface of tape, thereby releasing the tape 2, and the tape 2 ejects by its own elastic force. When the tape 2 reaches a certain length, the user can release the control element 31 of the brake portion 3 to let the control element 31 go back by the elastic force of torsion spring 33, thereby finishing the ejecting operation of the tape.

Figure 6A:
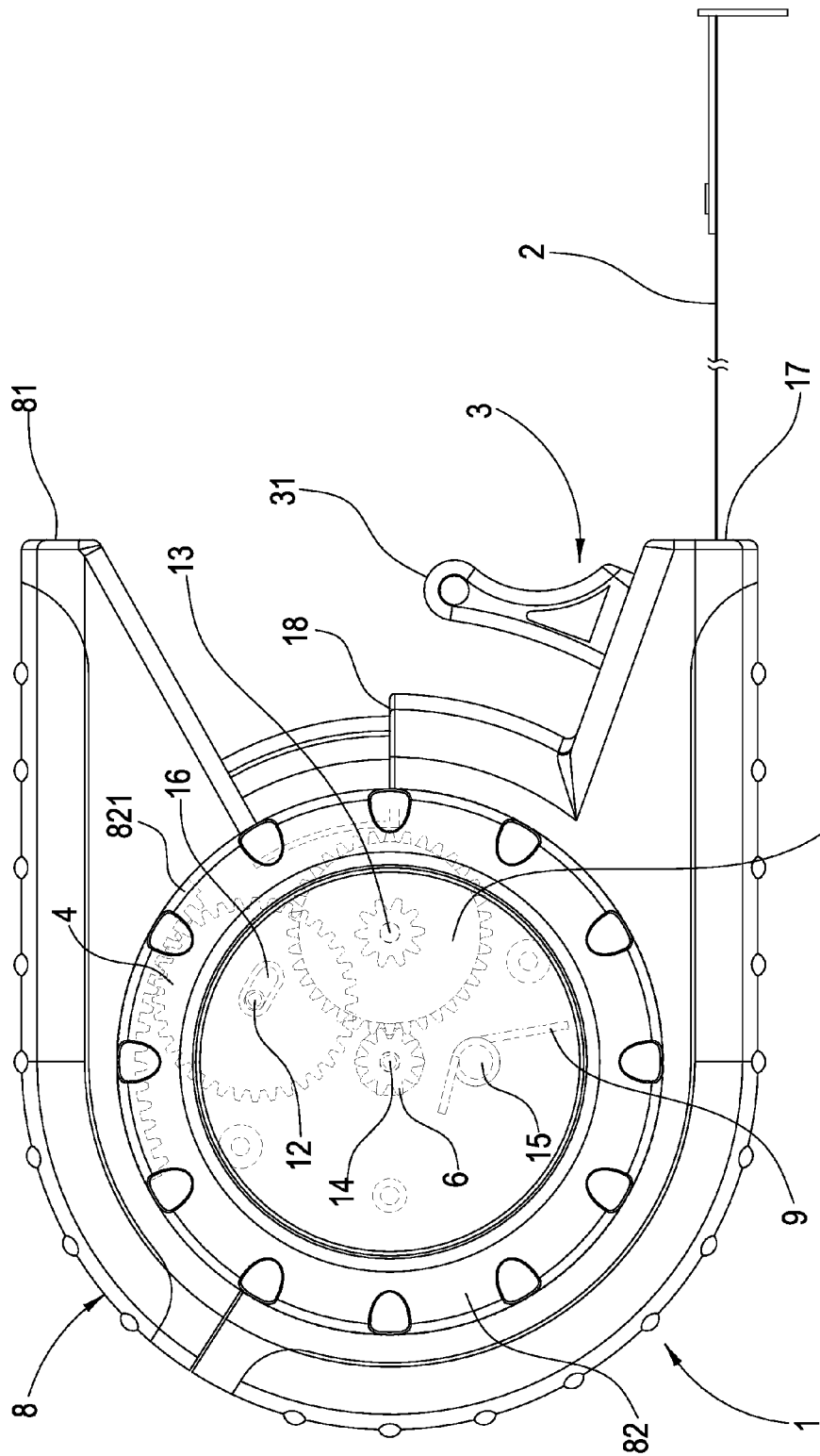
FIGS. 6A, B, C illustrates tape retraction views of the enhanced structure for measuring tape disclosed in the present invention.
Figure 6:
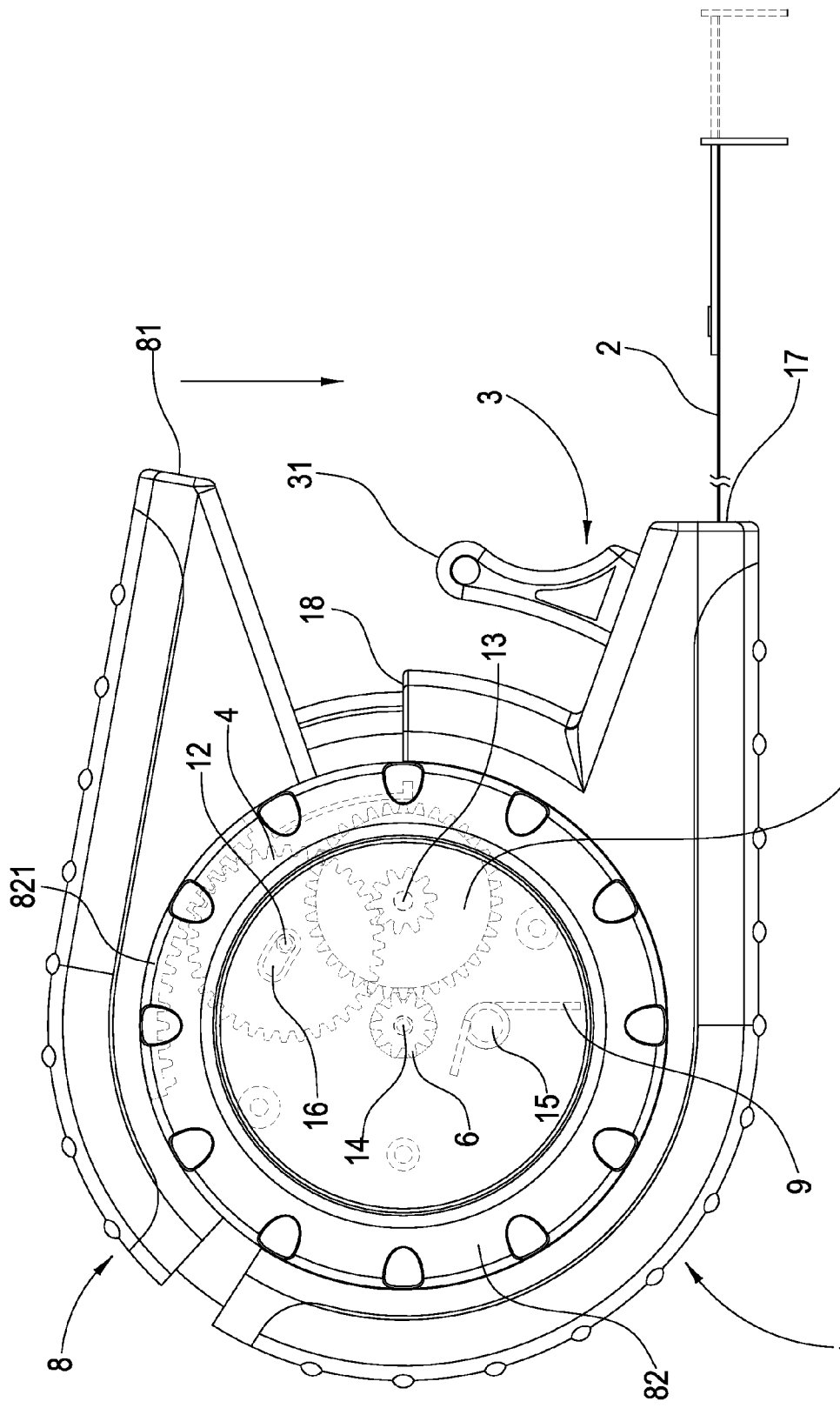
Figure 6C:
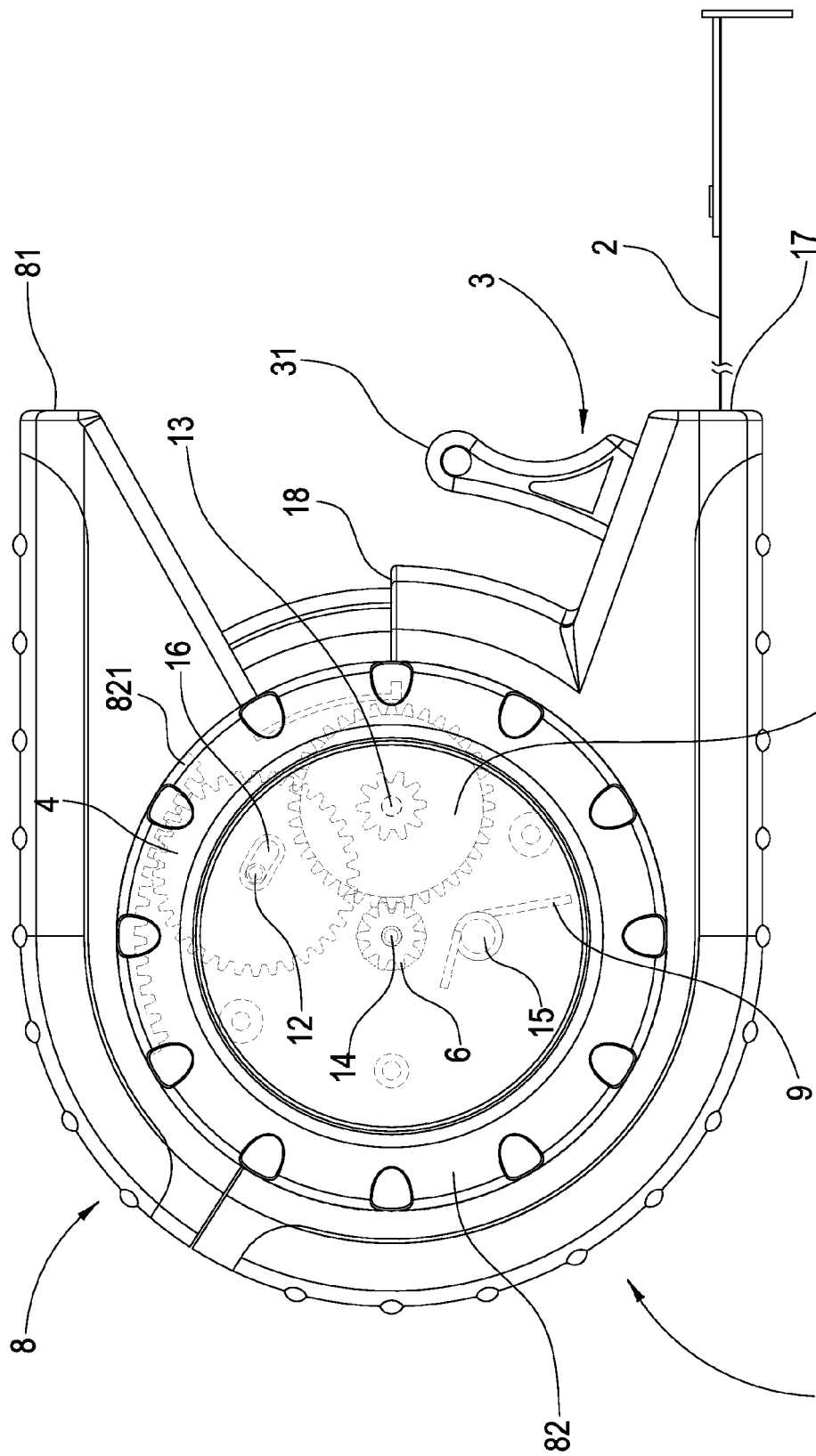

FIGS. 6A, B, C illustrates tape retraction views of the enhanced structure for measuring tape disclosed in the present invention. When a user wants to retract the ejected tape 2, he/she can use the hand that holds the tape casing 1 to press the press portion 81 of the press button 8 to let the pivot joint portion 82 of the press button 8 to rotate an angle, and the retracting element 9 generate elastic force to cause the transmission element 4 to move down along with the press button and to mesh with the driving element 5; the transmission element 4 is affected by the rotating pivot joint portion 82 of the press button 8 and to rotate with the curved tooth face 821, and then drives the driving element 5 to rotate with it, the driving element 5 also drives the power receiving element 6 to cause the wheel 11 to turn reversely to retract a length of the tape 2 on the wheel 11 back on the wheel 11, when the press button 8 is not being pressed, an elastic force of the retracting element 9 returns the press button 8 to an original position to let the transmission element 4 break away from the driving element 5 to keep the tape 2 from being ejected. By repeating the above steps, the tape 2 is retracted to the tape casing 1.

The present invention provides an enhanced structure for measuring tape, while compared to other traditional techniques, is advantageous in:

1. The present invention provides an enhanced structure for measuring tape, which lets the tape eject and retract automatically and continuously to provide user-friendly operation, while avoiding high speed retraction to hurt users.

2. The present invention provides an enhanced structure for measuring tape, which reduces the use of spring to save cost.

3. The present invention uses transmission element, driving element and power receiving element of different gear ratios to increase the torque when wheel turns to retract the tape.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An enhanced structure for measuring tape, comprises:
a tape casing having a wheel disposed in its interior, a metal tape being wound around said wheel and having a tail end fixedly connected to said wheel; a transmission element, a driving element, a power receiving element and a retracting element pivotally connecting to a lateral surface of said tape casing, wherein said transmission element can move a distance, said driving element and said power receiving element mesh with each other, and said power receiving element links with said wheel; said retracting element having one end fixed to said tape casing;
a brake portion removably linking up with a bottom side of said tape casing and being placed near a tape outlet to stop a tape from ejecting continuously;
a press button having a press portion and a pivot joint portion, said pivot joint portion having a curved tooth face disposed at top of inner wall thereof; said press button pivotally connecting to tape casing to have said press portion of said press button placed on top of said tape casing, said pivot joint portion of said press button pivotally connecting to both lateral sides of said tape casing for said curved tooth face on the inner wall of said pivot joint portion to mesh with said transmission element, said retracting element on said lateral surface of said tape casing having its another end fixedly connected to said press button; when retracting said ejected tape, one can press said press button downward to let said press button drive said transmission element to move down and to turn synchronously to let said transmission element mesh with said driving element, thus causing said driving element and said power receiving element to turn synchronously so as to drive said wheel to turn reversely to retract a length of said tape, when press button is not being pressed, an elastic force of said retracting element returns said press button to an original position to let said transmission element break away from said driving element.

2. The enhanced structure for measuring tape as recited in claim 1, wherein pivots extend from a surface of said wheel and protrude out of said tape casing for pivotally connecting said transmission element, driving element, power receiving element and retracting element.

3. The enhanced structure for measuring tape as recited in claim 1, wherein said tape casing comprises a guide trough disposed on a lateral surface of said tape casing, said guide trough is used for allowing said pivot which pivotally connects to said transmission element, to pass through said guide trough for said transmission element to be able to move a distance inside said guide trough.

4. The enhanced structure for measuring tape as recited in claim 1, wherein said tape casing has pivots extended from a lateral surface thereof for said driving element and said retracting element to connect with said pivots.

5. The enhanced structure for measuring tape as recited in claim 1, wherein said tape casing comprises said lateral surface which has said transmission element, driving element and power receiving element disposed thereon, said lateral surface can combine with a cover for covering said transmission element, driving element and power receiving element and holding them in position.

6. The enhanced structure for measuring tape as recited in claim 1, wherein said transmission element driving element and power receiving element can be gears, driving element can be two gears which mesh with each other and have different gear ratios, wherein said gear with smaller gear ratio meshes with said transmission element and said gear with larger gear ratio meshes with said power receiving element.

7. The enhanced structure for measuring tape as recited in claim 1, wherein said retracting element can be a torsion spring.

8. An enhanced structure for measuring tape, comprises:
a tape casing having a wheel disposed in its interior, a metal tape being wound around said wheel and having a tail end fixedly connected to said wheel; a transmission element, a driving element, a power receiving element and a retracting element pivotally connecting to a lateral surface of said tape casing, wherein said transmission element can move a distance, said driving element and said power receiving element mesh with each other, and said power receiving element links with said wheel; said retracting element having one end fixed to said tape casing;
a brake portion comprising a control element and a brake element linking with each other, and a shaft connecting with a torsion spring, said brake portion removably linking up with a bottom side of said tape casing and being placed near a tape outlet for said control element to protrude out of said tape casing and said brake element to lean against a surface of said tape, said shaft being fixed inside said tape casing and placed behind said brake element for said torsion spring on said shaft to be held against a bottom side of said control element;
a press button having a press portion and a pivot joint portion, said pivot joint portion having a curved tooth face disposed at top of inner wall thereof, said press button pivotally connecting to tape casing to have said press portion of said press button placed on top of said tape casing, said pivot joint portion of said press button pivotally connecting to both lateral sides of said tape casing for said curved tooth face on the inner wall of said pivot joint portion to mesh with said transmission element, said retracting element on said lateral surface of said tape casing having its another end fixedly connected to said press button;
when retracting said ejected tape, one can press said press button downward to let said press button drive said transmission element to move down and to turn synchronously to let said transmission element mesh with said driving element, thus causing said driving element and said power receiving element to turn synchronously so as to drive said wheel to turn reversely to retract a length of said tape, when press button is not being pressed, an elastic force of said retracting element returns said press button to an original position to let said transmission element break away from said driving element.

9. The enhanced structure for measuring tape as recited in claim 8, wherein pivots extend from a surface of said wheel and protrude out of said tape casing for pivotally connecting said transmission element, driving element, power receiving element and retracting element.

10. The enhanced structure for measuring tape as recited in claim 8, wherein said tape casing comprises a guide trough disposed on a lateral surface of said tape casing, said guide trough is used for allowing said pivot which pivotally connects to said transmission element, to pass through said guide trough for said transmission element to be able to move a distance inside said guide trough.

11. The enhanced structure for measuring tape as recited in claim 8, wherein said tape casing has pivots extended from a lateral surface thereof for said driving element and said retracting element to connect with said pivots.

12. The enhanced structure for measuring tape as recited in claim 8, wherein said tape casing comprises said lateral surface which has said transmission element, driving element and power receiving element disposed thereon, said lateral surface can combine with a cover for covering said transmission element, driving element and power receiving element and holding them in position.

13. The enhanced structure for measuring tape as recited in claim 8, wherein said transmission element driving element and power receiving element can be gears, driving element can be two gears which mesh with each other and have different gear ratios, wherein said gear with smaller gear ratio meshes with said transmission element and said gear with larger gear ratio meshes with said power receiving element.

14. The enhanced structure for measuring tape as recited in claim 8, wherein said retracting element can be a torsion spring.

15. The enhanced structure for measuring tape as recited in claim 8, wherein said brake element can be a roller.

\* \* \* \* \*